United States Patent
Jiang

(10) Patent No.: US 11,570,801 B2
(45) Date of Patent: Jan. 31, 2023

(54) TEMPORAL-ALIGNMENT PERSISTENT SCHEDULING

(71) Applicant: Kabushiki Kaisha Toshiba, Tokyo (JP)

(72) Inventor: Nan Jiang, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/130,527

(22) Filed: Dec. 22, 2020

(65) Prior Publication Data
US 2022/0201719 A1    Jun. 23, 2022

(51) Int. Cl.
*H04W 72/12* (2009.01)
*H04W 72/14* (2009.01)

(52) U.S. Cl.
CPC ... *H04W 72/1268* (2013.01); *H04W 72/1242* (2013.01); *H04W 72/1284* (2013.01); *H04W 72/14* (2013.01)

(58) Field of Classification Search
CPC ......... H04W 72/1268; H04W 72/1242; H04W 72/1284; H04W 72/14
See application file for complete search history.

(56) References Cited

U.S. PATENT DOCUMENTS

| | | | |
|---|---|---|---|
| 10,135,591 B2 | 11/2018 | Chen et al. | |
| 2009/0207768 A1* | 8/2009 | Wang | H04W 72/1289 370/280 |
| 2015/0156790 A1* | 6/2015 | Han | H04W 72/087 370/329 |
| 2018/0092104 A1 | 3/2018 | Sheng et al. | |
| 2018/0132234 A1 | 5/2018 | Cavalcanti et al. | |
| 2018/0184438 A1 | 6/2018 | Cavalcanti et al. | |
| 2018/0184444 A1 | 6/2018 | Li et al. | |
| 2019/0320437 A1 | 10/2019 | Gupta et al. | |
| 2020/0413420 A1* | 12/2020 | Nam | H04W 24/10 |

OTHER PUBLICATIONS

Aijaz et al., "The Tactile Internet for Industries: A Review", Proceedings of the IEEE, vol. 107, No. 2, Feb. 2019, 22 pages.
Aijaz, "Packet Duplication in Dual Connectivity Enabled 5G Wireless Networks: Overview and Challenges", Wireless and Radio Communications, IEEE Communications Standards Magazine, vol. 3, No. 3, Sep. 2019, 9 pages.
U.S. Appl. No. 16/851,257, filed Apr. 17, 2020, Aijaz.
U.S. Appl. No. 16/851,556, filed Apr. 17, 2020, Aijaz.

* cited by examiner

*Primary Examiner* — Kevin M Cunningham

(74) *Attorney, Agent, or Firm* — Oblon, McClelland, Maier & Neustadt, L.L.P.

(57) ABSTRACT

Scheduling on a wireless communications channel is carried out on the basis of demanded traffic on the channel. A root scheduling cycle is set on the basis of traffic levels, and alignment parameters are defined to define how traffic is to be allocated to the scheduling cycle.

19 Claims, 14 Drawing Sheets

TEMPORAL-ALIGNMENT PERSISTENT SCHEDULING

FIELD

The present disclosure relates to scheduling of communications in the field of wireless communication.

BACKGROUND

Numerous wireless communication protocols rely on scheduling for granting access to a communication channel. Scheduling is used to ensure that transmissions take place at times which are expected by potential recipient devices, and to ensure that the channel is in use only by a single transmitting device at a time. In certain standardized communications protocols, scheduling is carried out according to a strict set of rules to ensure that all devices can be configured to be ready to receive scheduling information from a centralized source, often a Base Station, to determine if they should then configure themselves to transmit information thereafter and in what time slot.

DESCRIPTION OF EMBODIMENTS

Figure 1:
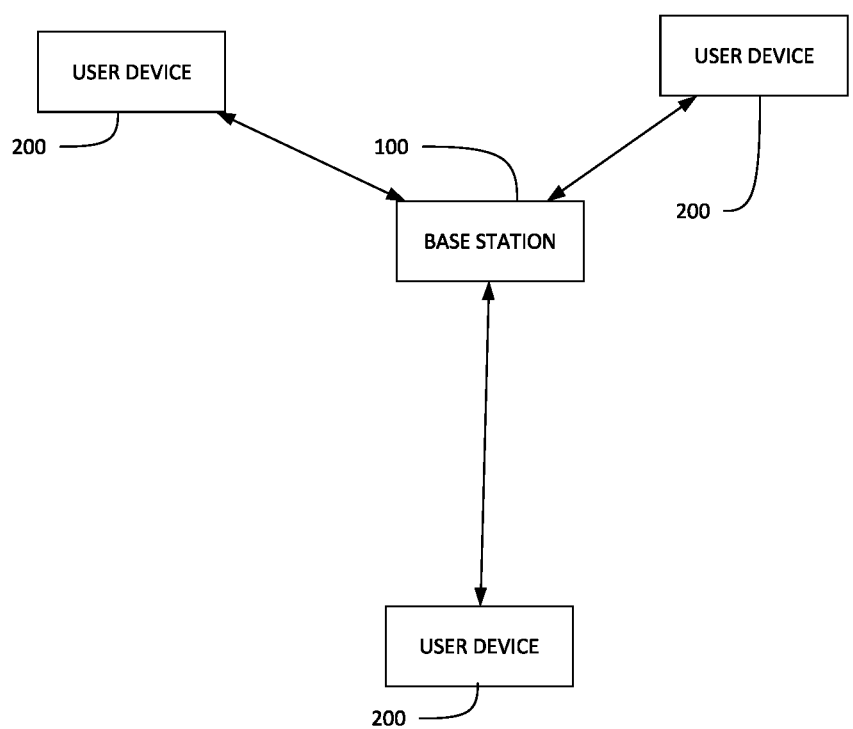
FIG. 1 is a schematic view of a wireless communications network in accordance with an embodiment.

Persistent scheduling (PS) is a channel scheduling scheme, which enables a sequence of periodic traffic packets to be served on a channel. Various embodiments of PS exist, for scheduling both on a downlink (i.e. from a base station, BS) or an uplink (i.e. from a connected device) according to a variety of technical standards in the field of wireless communication, such as 3GPPL LTE, LTE, 5G NR, IEEE 802.16.

In PS, the BS allocates a sequence of channel units, defined in the time domain, with a fixed gap interval and a fixed Modulation and Coding Scheme (MCS), according to characteristics of the traffic on the channel. For instance, in cellular networks, a BS can allocate periodic slots via Radio Resource Control (RRC) signaling or Layer 1/Layer 2 signaling to the associated device. Given a long enough channel coherence time, PS only requires one scheduling for a whole sequence of packets.

By contrast, Dynamic Scheduling (DS), concretely allocates resource to each packet to be transmitted, by issuing a Scheduling Grant (SG). Compared with DS, PS tends to consume less channel resource in control signaling, but PS can be less reliable because it does not respond packet-by-packet to channel state. Meanwhile, as PS has a lower control signaling requirement, it has a simpler network control procedure, which can reduce end-to-end latency. For these reasons, PS has been adopted for VoIP transmissions in classical cellular systems, and is considered to be one of the key scheduling schemes for critical periodical traffic in vehicle-to-X (V2X) and Ultra-Reliable Low-Latency Communication (URLLC)-enabled cellular systems.

One of the most challenging problems in PS is that its scheduling period often does not match the forthcoming traffic period. Given a fixed length of channel units, this is due to the fact that the scheduling period is an integer multiple of this channel unit length, while the traffic period can be any number.

For example considering a system running on integrated TSN and 5G, TSN traditionally relies on time-domain access on the physical medium with transmission windows as short as 10-20 µs, while 5G RAN exploits frequency domain multiplexing of users on time-slots or mini-slot in the order of the minimal 125 µs (considering a case with low MCS index and bandwidth). In these scenarios, a BS may schedule channel units with a fixed period that is either slightly bigger than, or smaller than, the traffic period. If the channel units are bigger than the traffic period, this can result in the latency gradually increasing over time, while if they are smaller, this can result in low channel utilization and relatively high jitter.

Embodiments disclosed herein seek to provide scheduling schemes for those period-mismatching scenarios, that satisfy the condition of using as little as channel resources, and that minimize the following two Key Performance Indicators (KPIs):

1) the transmission latency, and
2) jitter (i.e., the variance of the latency between two successive transmissions).

Specifically, a Temporal-Alignment Persistent Scheduling (TAPS) scheme is described, which, for any arbitrary traffic period, can persistently schedule every slot located directly after every packet arrival.

The TAPS scheme of the present disclosure is intended to schedule channel resources for periodical traffic in wireless networks. Some of the key structural features of this approach are described as follows.

N-Alignment Process

Given a series of periodically generated packets, a conventional PS scheme utilizes a single scheduling procedure for a BS to assign periodic channel units. The period of these channel units will remain unchanged for a fixed duration (e.g., 500 ms in 5G NR). After this duration, if the traffic is still active, the BS re-schedules channel units via a new PS procedure.

In the presently described embodiments, employing TAPS, a BS schedules channel units according to a variable period. The period length at a particular instant is revised according to a principle based on N different alignment cycles. Here, the required number N of alignment cycles is obtained by a recursion algorithm. Alignment aims to ensure that, for each assignment, the assigned slot is located directly after a corresponding packet arrival. During scheduling, the BS calculates alignment parameters and informs the associated device via control signaling. During transceiving, based on these alignment parameters, both the BS and the device can derive the exact slot index of each assigned channel unit by using the same approach. By doing so, the N-alignment process helps to find slots located directly after each packet arrival.

Transmission Duplication with Temporal Diversity

In standard technologies such as 5G, the frame and lattice structure used by a particular device for a standard-compliant waveform is governed by a set of parameters which are collectively known as a "numerology". A feature of 5G technology is that a plurality of numerologies are permitted to coexist, which is known as a multi-numerology model.

For the bandwidth activated (defined) for communication, each device can have a different numerology depending upon the required data rates. In one example, a device may transmit duplicated using two or more numerologies, hence spreading the data by frequency.

Existing techniques duplicate messages using different numerologies simultaneously, which solely aims at solving the problem that transmission may not be reliable with a single path link. The presently disclosed Transmission Duplicated Time-Redundant TAPS (TD-TR-TAPS) scheme successively transmits duplicate messages with respect to time using different numerologies, which not only improves reliability, but also reduces transmission delay. Note that the transmission duplication with temporal diversity would reduce the transmission delay only if it was employed with the presently disclosed TAPS scheme, instead of conventional PS schemes.

In terms of implementation, TD-TR-TAPS can be employed in a dual connectivity solution, where the transmitter duplicates each data packet over two independent networks. Besides, TD-TR-TAPS can also be employed in fixed-length bundled transmission in which each packet contains not only data, but also forward error correction information; thus receivers can be exploited to achieve a hybrid automatic repeat request (HARQ)-like functionality.

System Description

FIG. 1 illustrates a wireless network 10, comprising a Base Station (BS) 100 and a plurality of user devices 200 in communication with the BS 100. The reader will appreciate that a user device may be of a variety of types—it may be a user device (user equipment) in the form of a hand-held device or other user oriented computing device, or it may be integrated into or an interface to a machine, such as an industrial machine, which may be automated or intended for user interaction.

Figure 2:
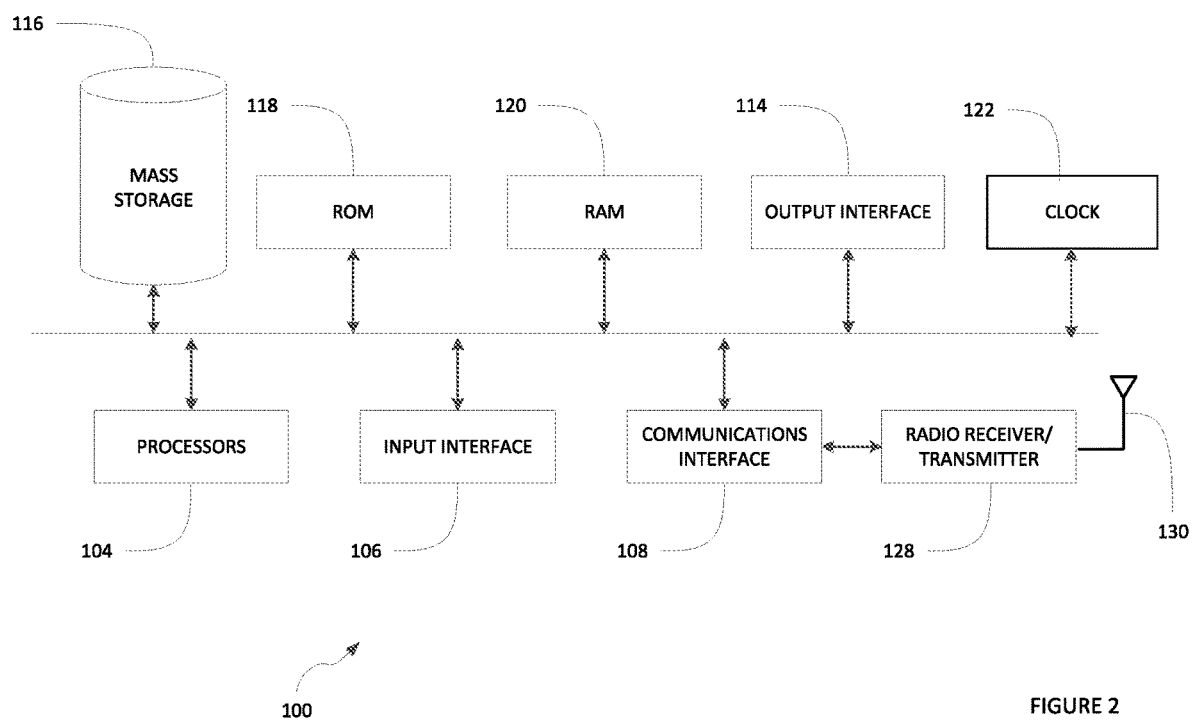
FIG. 2 is a schematic view of the architecture of a base station of the network of FIG. 1.

FIG. 2 illustrates the architecture of a base station 100. As shown in FIG. 2, the base station is a computer apparatus, in structure and function. It may share certain features with general purpose computer apparatus, but some features may be implementation specific, given the specialised function for which the base station is to be put. The reader will understand which features can be of general-purpose type, and which may be required to be configured specifically for use in a wireless communications transmitter.

The base station 100 thus comprises one or more processors 104, either generally provisioned, or configured for other purposes such as mathematical operations, audio processing, managing a communications channel, and so on.

An input interface 106 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader. It will be appreciated that such user input actions would not normally be required in general operation, but may be required in installation or maintenance of the equipment.

Likewise, an output interface 114 is operable to provide a facility for output of signals to a user or another device. Such output could include a display signal for driving a local video display unit (VDU) or any other device.

A communications interface 108 implements a communications channel, whether broadcast or end-to-end, with one or more recipients of signals. In the context of the present embodiment, the communications interface is configured to cause emission of a signal encoded by the base station, and to receive and decode signals received from other stations. The communications interface 108 is in communication with a receive/transmit unit 128 which is operable to translate signals between the domain used by the controller and the radio signal domain used for wireless communication, the radio signal domain signals being transmitted and received at an antenna 130.

The processors 104 are operable to execute computer programs, in operation of the base station 100. In doing this, recourse is made to data storage facilities provided by a mass storage device 116 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 118 is preconfigured with executable programs designed to provide the core of the functionality of the base station 100, and a Random Access Memory 120 is provided for rapid access and storage of data and program instructions in the pursuit of execution of a computer program. Each of these is configured to implement a communications protocol adopted by plural interoperable devices.

A clock 122 provides a timing signal for all other components of the device. The clock signal can be adjusted if required, for synchronization with other devices.

Figure 3:
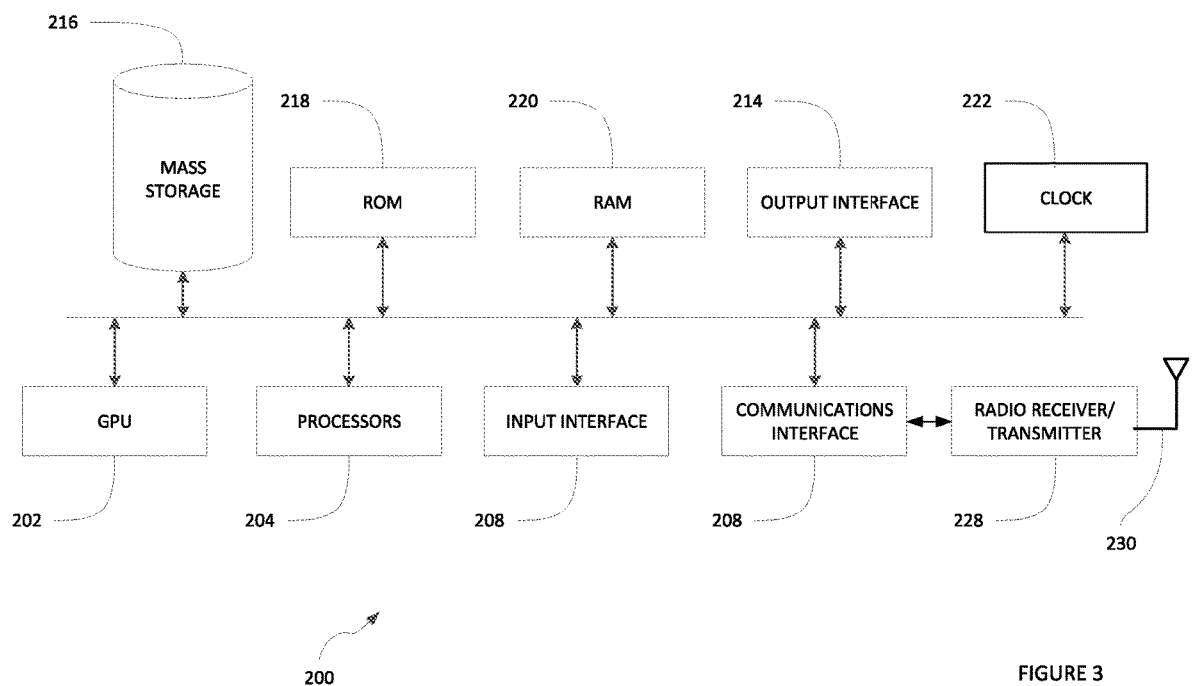
FIG. 3 is a schematic view of the architecture of a mobile station of the network of FIG. 1.

FIG. 3 illustrates the architecture of the user device (or "UE") 200. As shown in FIG. 3, the UE 200 is a computer apparatus, in structure and function. It may share certain features with general purpose computer apparatus, but some features may be implementation specific, given the specialised function for which the UE 200 is to be put. The reader will understand which features can be of general-purpose type, and which may be required to be configured specifically for use in a user device.

The UE 200 thus comprises a parallel processor 202 configured for specific use in processing large data sets, suitable for use in digital communication. The UE 200 also comprises one or more other processors 204, either generally provisioned, or configured for other purposes such as mathematical operations, audio processing, managing a communications channel, and so on.

An input interface 208 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 214 is operable to provide a facility for output of signals to a user or another device. Such output could include a display signal for driving a local video display unit (VDU) or any other device.

A communications interface 208 implements a communications channel, whether broadcast or end-to-end, with one or more recipients of signals. In the context of the present embodiment, the communications interface is configured to cause emission and reception of signals via a receive/transmit interface 228 and a radio antenna 230.

The processors 202, 204 are operable to execute computer programs, in operation of the UE 200. In doing this, recourse is made to data storage facilities provided by a mass storage device 216 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 218 is preconfigured with executable programs designed to provide the core of the functionality of the UE 200, and a Random Access Memory 220 is provided for rapid access and storage of data and program instructions in the pursuit of execution of a computer program. Each of these is configured to implement a communications protocol adopted by plural interoperable devices.

A clock 222 provides a timing signal for all other components of the device. The clock signal can be adjusted if required, for synchronization with other devices.

The channel in this network is divided into channel units with equal lengths from the temporal domain. The temporal length of a channel unit is measured by one slot. The network is subject to enable data exchange between the BS 100 and the device 200, considering both uplink and downlink. The data is a sequence of packets periodically generated in either the BS 100 or the device 200 with a finite duration. To serve such periodical transmission, the BS is responsible to schedule channel resources in a persistent manner. In detail, the BS would determine the available channel units for the whole sequence of packets by one-shot scheduling before the transmission initializing.

Figure 4:
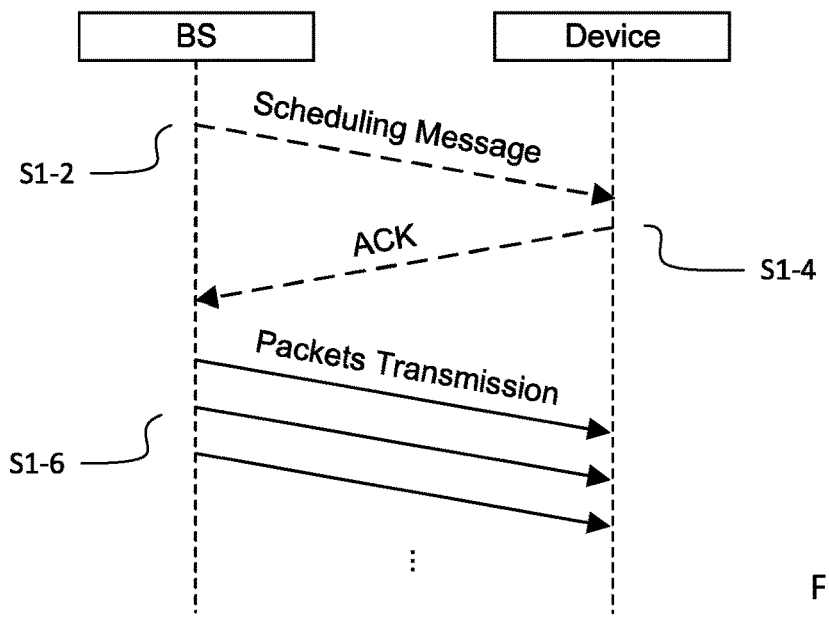
FIG. 4 is a diagram of a downlink transmission procedure using persistent scheduling implemented on the network of FIG. 1.

FIG. 4 illustrates the transmission procedure for the downlink case, which is described as follows: in step S1-2 the BS 100 first informs the device about the scheduled channel resource for a sequence of downlink transmissions by delivering a scheduling message; then, in step S1-4 the device 200 responds with an Acknowledgment (ACK) message; and finally, in step S1-6 the BS 100 periodically transmits packets to the device 200 using the scheduled downlink channel.

Figure 5:
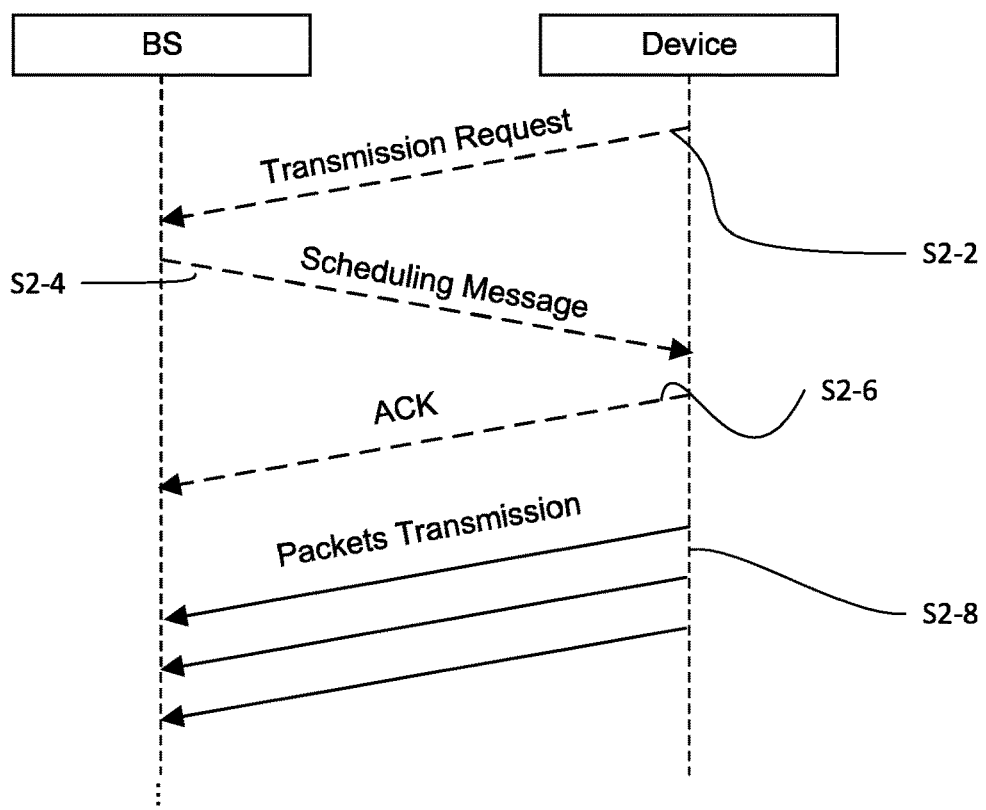
FIG. 5 is a diagram of an uplink transmission procedure using persistent scheduling implemented on the network of FIG. 1.

FIG. 5 illustrates the transmission procedure for the uplink case, which is described as follows: in step S2-2 the device 200 first requests uplink transmission by delivering a request message to the BS 100; in step S2-4 the BS informs the device 200 in a scheduling message as to the allocated uplink channel resources; in step S2-6 the device 200 responds with an ACK message; and finally, in step S2-8 the device 200 periodically transmits packets to the BS on the scheduled resources on the uplink channel.

Figure 6:
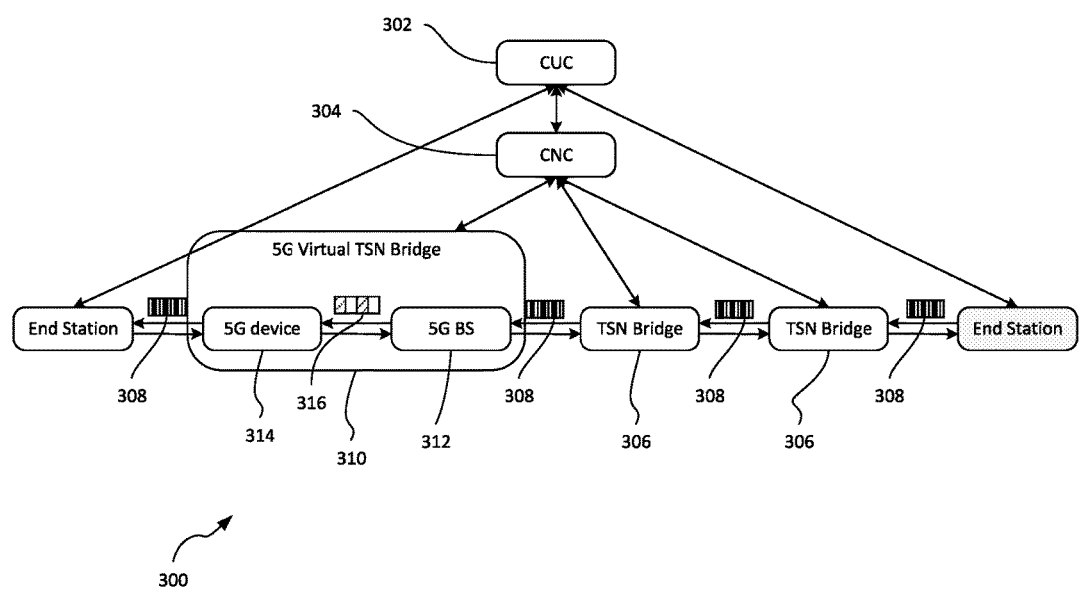
FIG. 6 is a schematic diagram of a TSN network in which the presently described embodiment can be implemented.

FIG. 6 provides an example of employing TAPS in a TSN network 300 incorporating a 5G virtual TSN bridge 310. A centralized user configuration (CUC) 302 is employed to represent the control applications, which makes requests to a central network controller (CNC) 304 for TSN communication with specific requirements for different flows via several TSN bridges 306. Among them, the 5G virtual TSN bridge 310 is employed to provide wireless connections among devices, including a 5G Base Station (BS) 312 and a 5G device 314. Given periodic traffic received in the 5G BS from the TSN bridge 306 on a periodic TSN transmission window 308, the 5G BS 312 can schedule periodic channel units 316 for downlink transmission to the device 314 according to TAPS.

Figure 7:
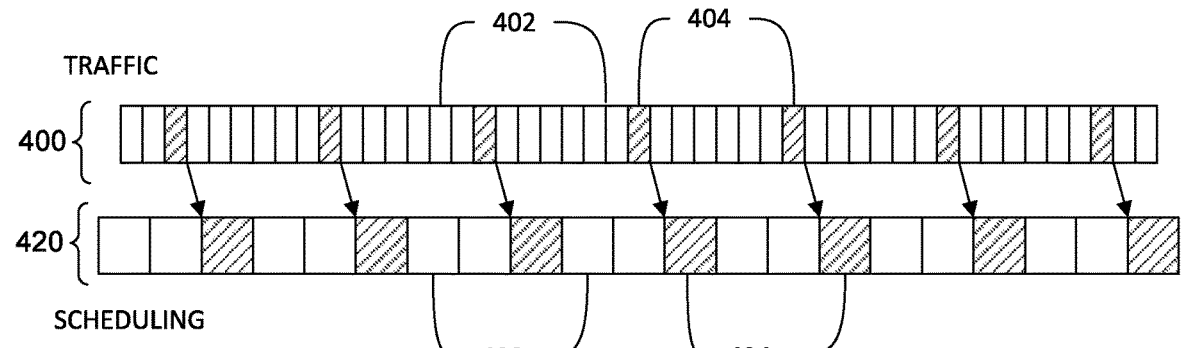
FIG. 7 is a periodic traffic model and a channel model for a conventional channel scheduling scheme.

FIG. 7 shows examples of a periodic traffic model and a channel model with scheduling via the conventional PS scheme. As illustrated, a transmitter implements an arbitrary packets generation process, which periodically generates packets with a fixed period $P_{trf}$. A line 400 of traffic slots 402 is shown, with the packets 404 indicated as diagonally hatched blocks. On a normalized time scale, the channel scheduling process initializes at a time $\tau=0$, the packets start to arrive at an arbitrary time $\tau_{trf}$ from $[0, \infty)$. The channel 420 comprises a plurality of successive channel units 422 (otherwise referred to as slots). Without loss of generality, it is assumed that every generated packet has the same size, and can be completely transmitted via one channel unit 422 (i.e. within a single slot). Scheduled transmissions 424 are indicated in FIG. 7 by diagonally hatched slots 422. Thus, the transmission takes place at the beginning of a slot, and is completed before the slot ends. Scheduling of traffic to the channel is indicated by diagonal hatching on the timeline, with correspondence between traffic 404 and scheduled slots 424 being indicated by single arrowhead arrows. The duration of a slot is $T_{sch}$, and it is further assumed that $T_{sch}$ is smaller than the period of the traffic $P_{trf}$. In other words, the case of channel insufficiency is not considered in this example.

Conventional PS Schemes

Considering a series of traffic packets with a fixed period $T_{trf}$, a BS serves such traffic by scheduling a single series of periodical channels with a fixed cycle $c_{fixed}$ and initializing at slot $t_{fixed}$. According to these two parameters, the index of slot of the mth assigned channel unit $w_{fixed}^m$ can be calculated by:

$$w_{fixed}^m = t_{fixed} + (m-1)c_{fixed}, \qquad (1)$$

where $m \in \{1, 2, \ldots, M\}$, and M is the total number of packets required to be served. Considering bounded latency and jitter, the channel utilization can be maximized when each packet 404 can correspond one-to-one to a scheduled slot 424, which occurs only if a scheduling cycle $c_{fixed}$ exists whose duration $T_{sch}*c_{fixed}$ is exactly equal to $P_{trf}$, namely, periods-matching event (see FIG. 7). In this case, the minimal transmission delay without jitter can be obtained by allocating periodical slots with the cycle $$c_{fixed} = \frac{P_{triff}}{T_{sch}} \quad (2)$$

Figure 8:
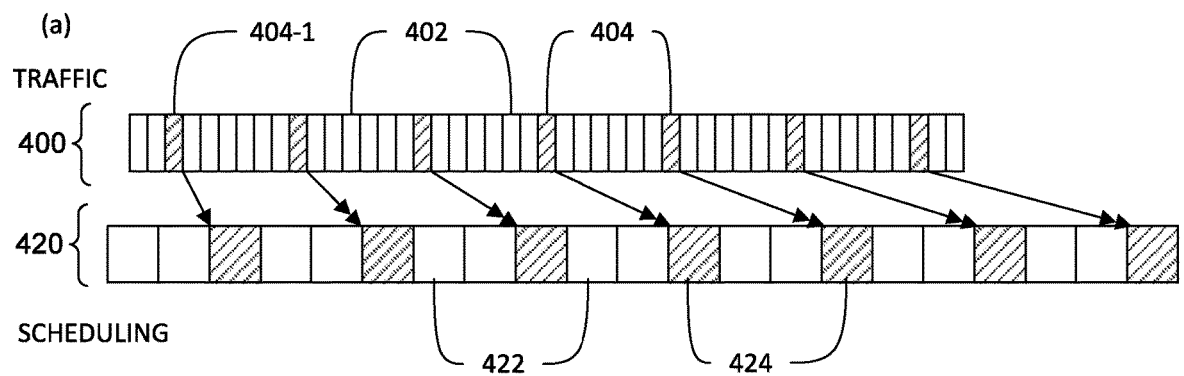
FIG. 8 illustrates comparative examples of scheduling when period mismatch occurs.
Figure 8:
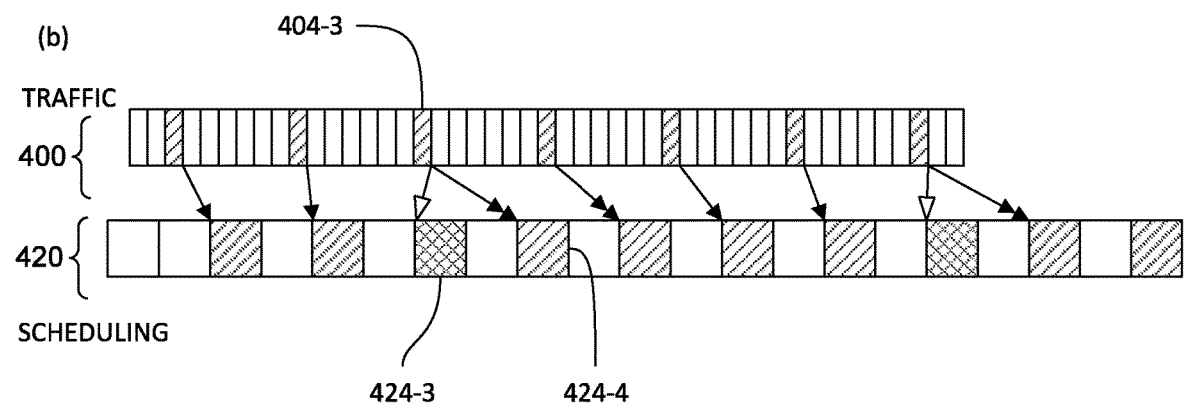
Figure 8:
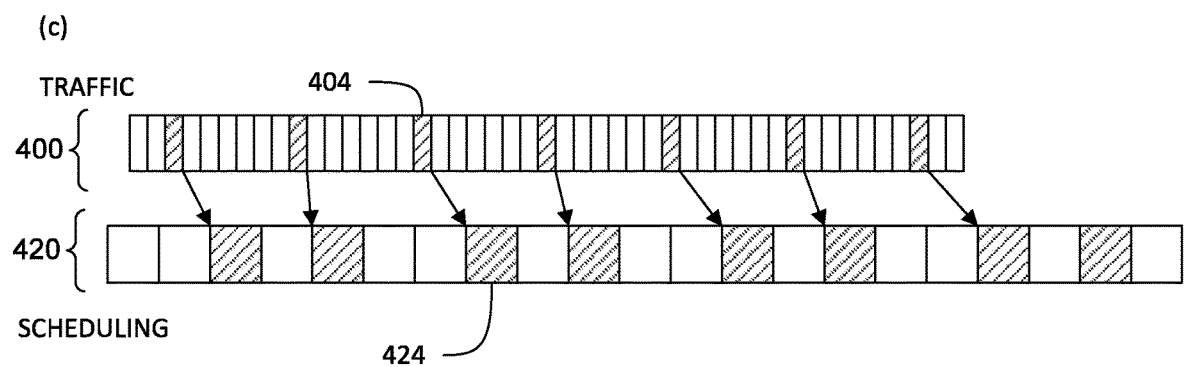

However, this exact matching between $P_{trff}$ and $T_{sch} * c_{fixed}$ is highly unlikely in reality. Those traffic periods $P_{trff}$ that cannot satisfy this restriction are named as period-mismatching events. FIG. 8 shows three cases (from the top, cases (a), (b) and (c)) which highlight the issues that can arise. To serve this type of traffic, the BS may schedule channel units 402 with a cycle duration $T_{sch} * c_{fixed}$ that is close to the traffic period $P_{trff}$. Unfortunately, the mismatch between the cycle duration of the scheduled channel units $T_{sch} * c_{fixed}$ and the traffic period $P_{trff}$ inevitably causes a temporal gap in each transmission, which may result in the increase of latency as well as jitter, and the waste of channel resources. In details, as illustrated in Case (a) of FIG. 8, slots 424 are scheduled according to a cycle that is slightly bigger than the traffic cycle $P_{trff}$ given by $$c_{fixed} = \left\lceil \frac{P_{triff}}{T_{Sch}} \right\rceil, \quad (3)$$

where $\lceil * \rceil$ is the ceiling function. It can be seen that the latency gradually increases along with time. As indicated, while the first traffic packet 404-1 is matched to the next available slot 424, the remaining packets are allocated to slots 424 later than the first available slot 422, so giving rise to an ever increasing latency between traffic and schedule. Allocations which result in latency are indicated by double-headed arrows in FIG. 8(a) and also in FIGS. 8(b) and 8(c).

By contrast, in Case (b), slots 422 are scheduled according to a cycle that is smaller than the traffic cycle given by $$c_{fixed} = 1, 2, 3, \ldots, \left\lfloor \frac{P_{triff}}{T_{Sch}} \right\rfloor, \quad (4)$$

where $\lfloor * \rfloor$ is the floor function. In this case, the first and second packets are successfully allocated to the immediately subsequent scheduled slot, but the third packet 404-3 arrives too late to be allocated to the third scheduled slot 424-3. In other words, the third scheduled slot 424-3 is too early to be used, and is thus wasted. This wasted slot is indicated by cross-hatching, and allocation failure by an unfilled arrowhead. The packet 404-3 is thus allocated to the fourth scheduled slot 424-4 instead. Between the third and fourth scheduled slots 424-3, 424-4, there is an intervening, unscheduled slot. Thus, the slot 424-4 allocated to the third packet 404-3 is not the first on the timeline, and so the allocation to slot 424-4 introduces a latency for that packet 404-3. This is indicated with a double-headed arrow.

This allocation continues. As illustrated, several slots are wasted due to the mismatch between arrival of packets for allocation and availability of scheduled slots. Latency does not increase continually; however, jitter is relatively high. This is indicated by instances of schedule slots being too early for allocation of traffic (as indicated by unfilled arrowheads) and the wasted slots being indicated by cross-hatched schedule slots on the timeline. The consequence of this is a later allocation of traffic to slots (with indicative latency), indicated by double arrowheads.

TAPS Scheme

The present disclosure describes a channel scheduling approach, namely TAPS, to enable channel scheduling as seen in FIG. 8(c). It can be seen that slots 424 have been scheduled so that a stream of packets 404 can be allocated to scheduled slots 424 without wasted slots and without latency. This is indicated by single head solid arrowheads.

Figure 9:
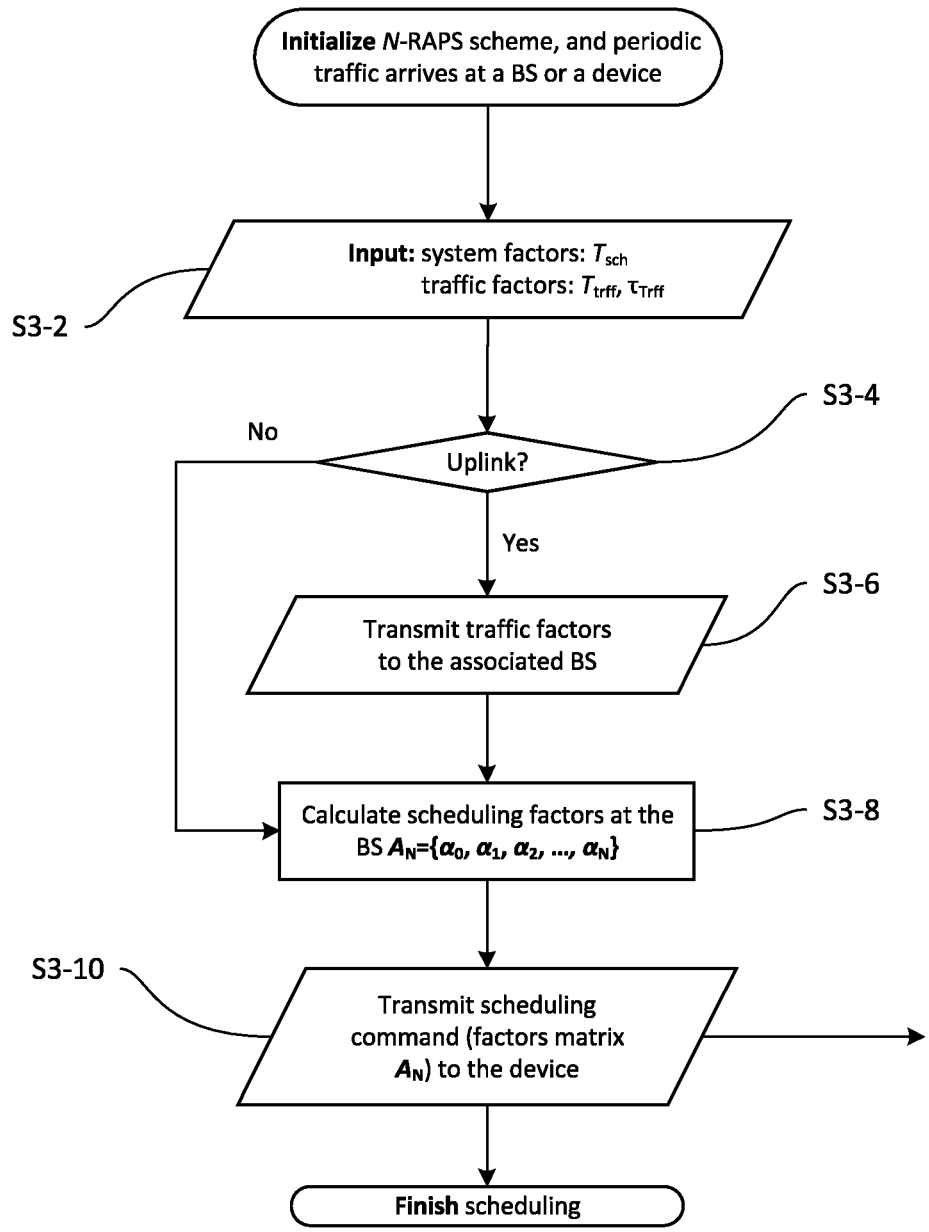
FIG. 9 is a flow diagram of a scheduling procedure in accordance with an embodiment.

FIG. 9 illustrates a scheduling procedure of TAPS in accordance with an embodiment. In this procedure, the BS 100 first initializes S3-2 with system factors, namely at least a scheduling window $T_{sch}$ and traffic factors, comprising prior information of traffic pattern, including traffic initial time $\tau_{trff}$, and traffic period $T_{trff}$.

If (S3-4) the procedure is being conducted for use on an uplink (i.e. the principal authority on scheduling is at another device, e.g. a BS), then the traffic factors are sent (S3-6) to the associated BS.

The process then (S3-8) calculates a tuple of scheduling factors $A_N = \{\vec{\alpha}_0, \vec{\alpha}_1, \vec{\alpha}_2, \ldots, \vec{\alpha}_N\}$ To do this, the BS 100 first derives a set of root factors $\vec{\alpha}_0 = \{t_0, c_0\}$, referring to the initial slot of the scheduling procedure (root time) and the basic scheduling cycle of channel units (root cycle), respectively. Note that, in contrast with conventional PS schemes, the root cycle $c_0$ can be varied. To tackle the problem of period-mismatching, the BS then derives a temporal-alignment policy, which revises the root cycle $c_0$ by postponing or expediting the scheduled channel units. This temporal-alignment policy consists of N number of alignment cycles according to the parameters $\{\vec{\alpha}_1, \vec{\alpha}_2, \ldots, \vec{\alpha}_N\}$, where the parameter of the level-1 alignment $\vec{\alpha}_1$ is used to align the root cycle $c_0$, and the alignment in each step $n(n>1)$ with parameters $\vec{\alpha}_n$ revises the cycle of doing the step n−1 alignment $c_{n-1}$. It will be noted that N refers to the required number of iterations to obtain the ideal solution, rather than a variable, which is jointly determined by the traffic period $P_{trff}$ and scheduling window $T_{sch}$ (to be defined following). These N alignment cycles are obtained by N-level iterative calculations. Any n-level calculation ($n \in \{1, 2, \ldots, N\}$) can obtain a set of factors $\vec{\alpha}_n = \{c_n, q_n, w_n\}$ with respect to the alignment cycle, the decision of either postponing or expediting, and the index of initial assignment.

Once the scheduling factors are calculated, a scheduling command, containing the factors matrix $A_N$ is issued (S3-10) for use by the device in executing the transmission/receiving procedure. Scheduling is then complete.

Figure 10:
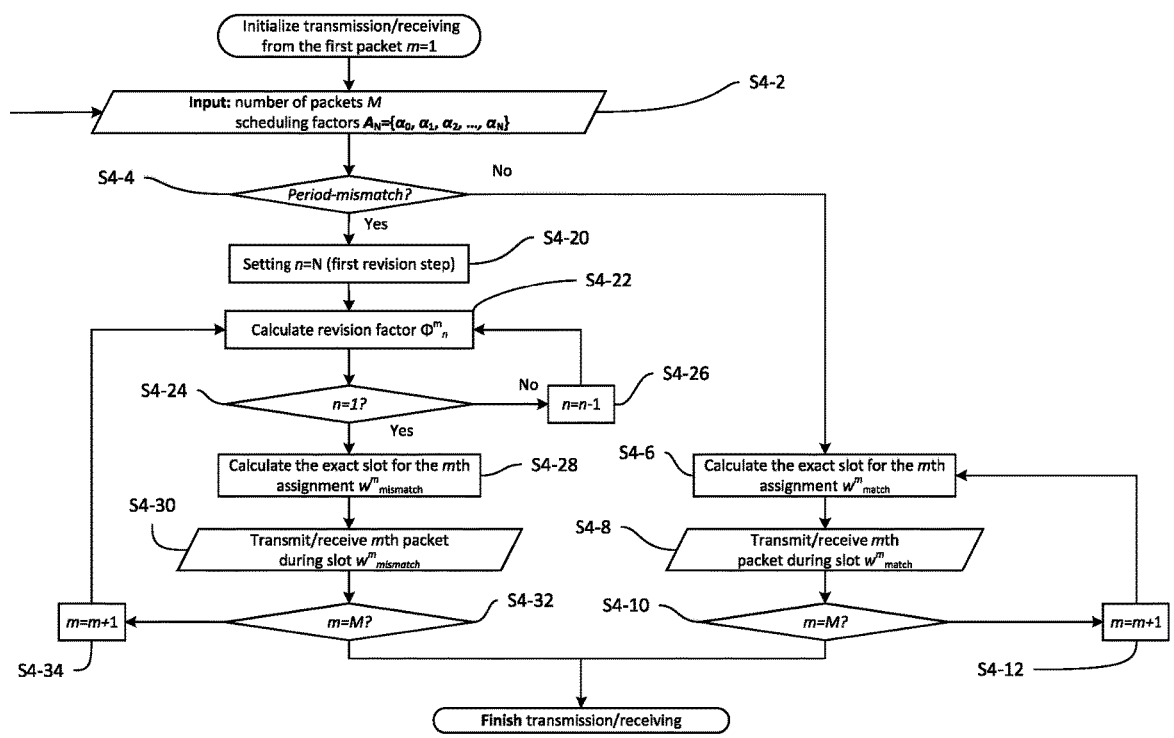
FIG. 10 is a flow diagram of an allocation procedure in accordance with an embodiment.

The transmission/receiving procedure is given in FIG. 10. After the scheduling procedure, transceivers are informed (S4-2) by the tuple of scheduling factors $A_N = \{\vec{\alpha}_0, \vec{\alpha}_1, \vec{\alpha}_2, \ldots, \vec{\alpha}_N\}$. A determination (S4-4) is made as to whether a periods-matching event has occurred. A periods-matching event occurs when transceivers solely receive root factors $A_N = \{\vec{\alpha}_0\}$, where the scheduling is executed similar to the conventional PS scheme. Accordingly, the slot of the mth assignment is obtained by:

$$\varphi_{match}^m = t_0 + (m-1)c_0, \quad (5)$$

In that case, the exact slot $w_{match}^m$ is calculated (S4-6) and transmitted (S4-8) for each packet from 0 to M (S4-10, S4-12).

A periods-mismatching event occurs when transceivers receive one or several alignment factors (N>0), where a scheduling policy is executed with level-N alignment cycle (S4-22, S4-24, S4-26), and the slot of the mth assignment (S4-32, S4-34) is obtained (S4-28) by:

$$\varphi_{mismatch}^m = t_0 + (m-1)c_0 + q_1\Phi_1^m, \quad (6)$$

Here, $q_1 \in \{-1, 1\}$. To explain, each received factor q equals either −1 or 1 and this represents decreasing or increasing trends of root cycle $c_0$ during the mth assignment, respectively. $\Phi_1$ is the exact number of slots to be revised during the mth assignment, which is accumulated over m slots. $\Phi_1$ is obtained by a finite recursion process, which is given by $$\Phi_n^m = \begin{cases} \left\lfloor \frac{c_n - w_n + m - q_{n+1}\Phi_{n+1}^m}{c_n} \right\rfloor, & n < N, \\ \left\lfloor \frac{c_n - w_n + m}{c_n} \right\rfloor, & n = N. \end{cases} \quad (7)$$

Packets are transmitted according to slot assignments (S4-30) as assignments are made.

Figure 11:
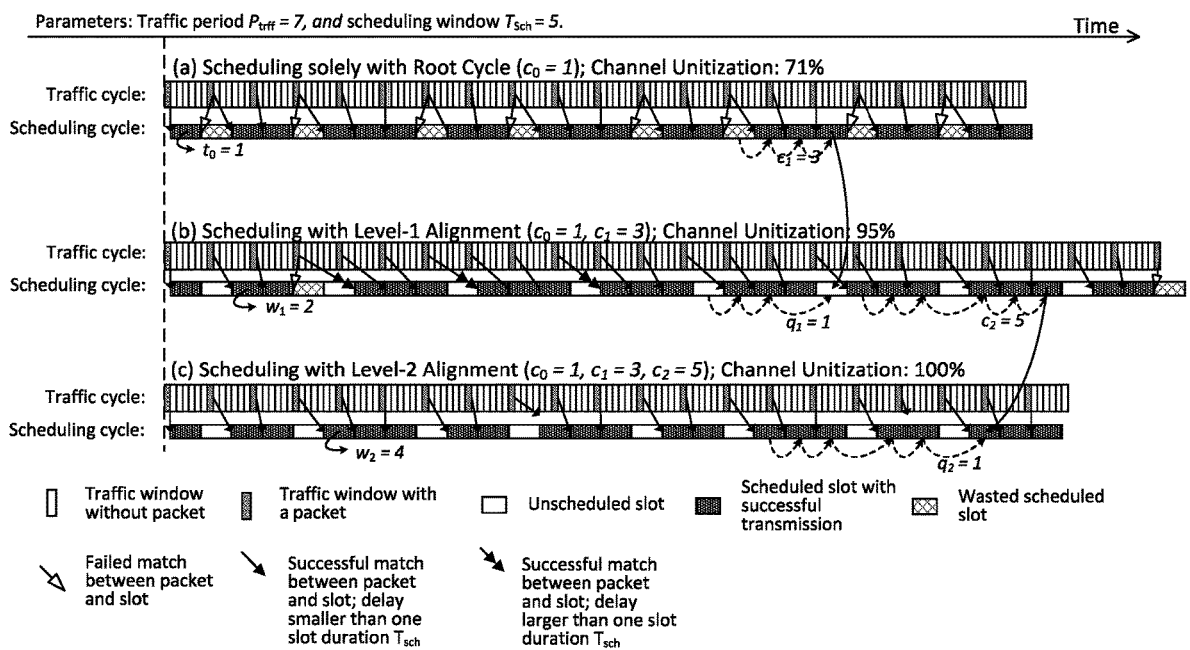
FIG. 11 is a timing diagram for scheduling and allocation in accordance with an embodiment.

An example of executing TAPS is given in FIG. 11. The input factors are traffic period $P_{trff}$=7, and scheduling window $T_{sch}$=5, and the scheduling factors are $A_2 = \{\vec{\alpha}_0, \vec{\alpha}_1, \vec{\alpha}_2\} = \{\{1, 1\}, \{3, 1, 2\}, \{8, -1, 5\}\}$.

FIG. 11(a) shows the case of transmission along time when solely using a root cycle with parameters in $\{\vec{\alpha}_0\}$, where a relatively large number of channel units are wasted. FIG. 11(b) shows the case when using the root cycle aided by the level-1 alignment with parameters $\{\vec{\alpha}_0, \vec{\alpha}_1\}$, where the granted channel is postponed ($q_1$=1) every 3 slots. FIG. 11(c) shows the case when using the root cycle aided by the level-1 and the level-2 alignments with full parameters in $A_2 = \{\vec{\alpha}_0, \vec{\alpha}_1, \vec{\alpha}_2\}$, where the event of level-1 alignment is postponed ($q_2$=1) every 5 slots, and the ideal scheduling performance result is obtained.

Figure 12:
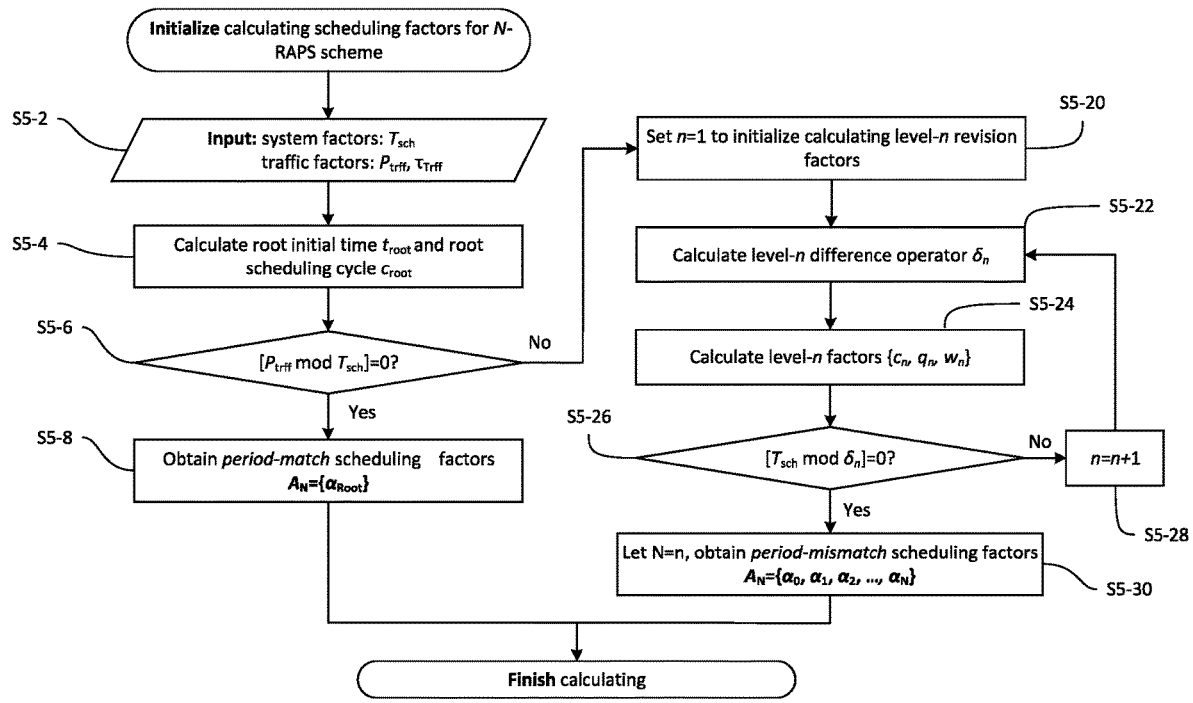
FIG. 12 is a flow diagram of a method of calculating scheduling factors in accordance with an embodiment.

An example will now be described of a method to derive every scheduling factor in tuple $A_N$. The calculation procedure of these scheduling factors is given in FIG. 12. As before, system factors and traffic factors initialize the process (S5-2).

Root Scheduling Cycle

The root initial slot $t_0$ and the root scheduling cycle $c_0$ are first calculated (S5-4). The root initial slot $t_0$ can be determined by counting the number of transmission windows within duration [0, $\tau_{trff}$], which is given by:

$$t_0 = \left\lceil \frac{\tau_{trff}}{T_{sch}} \right\rceil + 1 \quad (8)$$

Given a traffic cycle $P_{trff}$, the root cycle $c_0$ is selected by minimizing the gap between the traffic cycle $P_{trff}$ and the root duration with a number $x_0$ of scheduling windows, which is given as:

$$c_0 = \underset{x_0 \in \{1,2,\cdots,\infty\}}{\arg\min} |P_{trff} - x_0 T_{sch}| \quad (9)$$

Occasionally, selection of a cycle $X_0$ results in $P_{trff} - X_0 T_{sch} = (X_0+1)T_{sch} - P_{trff}$. In this case, both selections $x_0 = X_0$ and $x_0 = X_0+1$ would have the same performance. For clarity, only the case of selecting the bigger cycle $x_0 = X_0+1$ is considered in the following.

Executing scheduling solely reliant on the root cycle can result in three states, namely that its duration $c_0 T_{sch}$ can be exactly equal to, smaller than, or bigger than the traffic period $P_{trff}$. Each state corresponds to one operation as will be described. To ease the succeeding derivation as well as the implementation, root cycle derivation is transformed to a format that independently considers condition for every state (S5-6). This transformation is given as $$c_0 = \begin{cases} \frac{P_{trff}}{T_{Sch}}, & [P_{trff} \bmod T_{sch}] = 0, \\ \left\lfloor \frac{P_{trff}}{T_{Sch}} \right\rfloor, & 0 < [P_{trff} \bmod T_{sch}] \leq \left\lfloor \frac{T_{Sch}}{2} \right\rfloor, \\ \left\lceil \frac{P_{trff}}{T_{Sch}} \right\rceil, & \lfloor P_{trff} \bmod T_{sch} \rfloor > \left\lfloor \frac{T_{Sch}}{2} \right\rfloor. \end{cases} \quad (10)$$

Accordingly, each state corresponds to one of the operations described below. For state 1, solely employing cycle $c_0$ (S5-8) already offers the minimal transmission delay and jitter, as well as the maximal channel utilization, thus the iterative calculation terminates here.

Closed-Formed Derivation of Alignment Cycle $c_n$ and Decision $q_n$

When states 2 and 3 of the root cycle occur, the mismatch between the scheduled period $T_{sch}c_0$ and the traffic period $P_{trff}$ produces the waiting gap $P_{trff}^m - T_{sch}\varphi_{mismatch}^m$ in the mth assignment. This waiting gap increases (in state 2) or decreases (in state 3) along with time according to a fixed variable, namely, level-1 variable $\delta_1$, which is given by $$\delta_1 = |P_{trff} - c_0 T_{sch}|. \quad (11)$$

The waiting gap can be minimized by postponing and expediting scheduling units for one slot in the overly scheduled state (state 2) and in the insufficiently scheduled state (state 3), respectively. Accordingly, the decision $q_1$ in level-1 alignment is given by $$q_1 = \begin{cases} 1, & c_0 = \left\lfloor \frac{P_{trff}}{T_{Sch}} \right\rfloor, \\ -1, & c_0 = \left\lceil \frac{P_{trff}}{T_{Sch}} \right\rceil, \end{cases} \quad (12)$$

where $q_1$=1 refers to the action that a scheduled unit is postponed for one slot, and $q_1$=−1 refers to the action that a scheduled unit is expedited for one slot. To minimize the waiting gap generated by level-1 operator $\delta_1$, the postponing and expediting procedures can occur according to a fixed cycle, namely, level-1 alignment cycle $c_1$. The derivation of level-1 alignment cycle $c_1$ and its transformation are given as $$c_1 = \left( \underset{x_1 \in \{1,2,\cdots,\infty\}}{\arg\min} |T_{sch} - x_1 \delta_1| \right) \quad (13)$$

-continued $$= \begin{cases} \frac{T_{sch}}{\delta_1}, & [T_{sch} \bmod \delta_1] = 0, \\ \lfloor \frac{T_{sch}}{\delta_1} \rfloor, & 0 < [T_{sch} \bmod \delta_1] \leq \lfloor \frac{\delta_1}{2} \rfloor, \\ \lceil \frac{T_{sch}}{\delta_1} \rceil, & [T_{sch} \bmod \delta_1] > \lfloor \frac{\delta_1}{2} \rfloor. \end{cases}$$

The cycle alignment is complete if the condition of $[T_{sch} \bmod \delta_1]=0$ is obtained. Otherwise, the cycle alignment is executed by a finite recursion process until the condition $[T_{sch} \bmod \delta_N]=0$ is satisfied. For any level-n alignment ($n \in \{2,3,\ldots,N\}$) (S5-20, S5-28), the difference variable of waiting gap during each transmission, namely level-n variable $\delta_n$, can be calculated (S5-22) using the derived level-(n-1) cycle $c_{n-1}$, which is given by $$\delta_n = |c_{n-1}\delta_{n-1} - T_{sch}|. \tag{14}$$

The decision to postpone or expedite $q_n$ is given by $$q_n = \begin{cases} 1, & c_{n-1} = \lfloor \frac{T_{sch}}{\delta_{n-1}} \rfloor, \\ -1, & c_{n-1} = \lceil \frac{T_{sch}}{\delta_{n-1}} \rceil. \end{cases} \tag{15}$$

where $q_n=1$ refers to the action that postpones level-(n-1) alignment for one slot, and $q_n=-1$ refers to the action that expedites level-(n-1) alignment for one slot.

So, a level-n cycle $c_n$ can be said to be the frequency to minimize the gap generated by level-n variable $\delta_n$, which can be derived (S5-24) as:

$$c_1 = \left( \underset{x_n \in \{1,2,\cdots,\infty\}}{\mathrm{argmin}} |T_{sch} - x_n\delta_n| \right) \tag{16}$$

$$= \begin{cases} \frac{T_{sch}}{\delta_n}, & [T_{sch} \bmod \delta_n] = 0, \\ \lfloor \frac{T_{sch}}{\delta_n} \rfloor, & 0 < [T_{sch} \bmod \delta_n] \leq \lfloor \frac{\delta_n}{2} \rfloor, \\ \lceil \frac{T_{sch}}{\delta_n} \rceil, & [T_{sch} \bmod \delta_n] > \lfloor \frac{\delta_n}{2} \rfloor. \end{cases}$$

This iterative calculation is completed (S5-26) when obtaining a level-N alignment cycle $c_N$ satisfying the condition $[T_{sch} \bmod \delta_N]=0$.

Heuristic Derivation of Alignment Initial Index $w_n$

For a case requiring N alignments, it is necessary to know the tuple of scheduling factors $A_N=\{\vec{\alpha}_0, \vec{\alpha}_1, \ldots, \vec{\alpha}_N\}$ (S5-30).

$A_n=\{\vec{\alpha}_0, \vec{\alpha}_1, \ldots, \vec{\alpha}_n\}$ is defined as a subset of the tuple $A_N$, which is composed of the first n+1 vectors in $A_N$. Given a known subset $A_{n-1}$, the objective is to derive the exact initial index $w_n$ for any nth alignment, which is located in the nth vector $\vec{\alpha}_n$.

Figure 13:
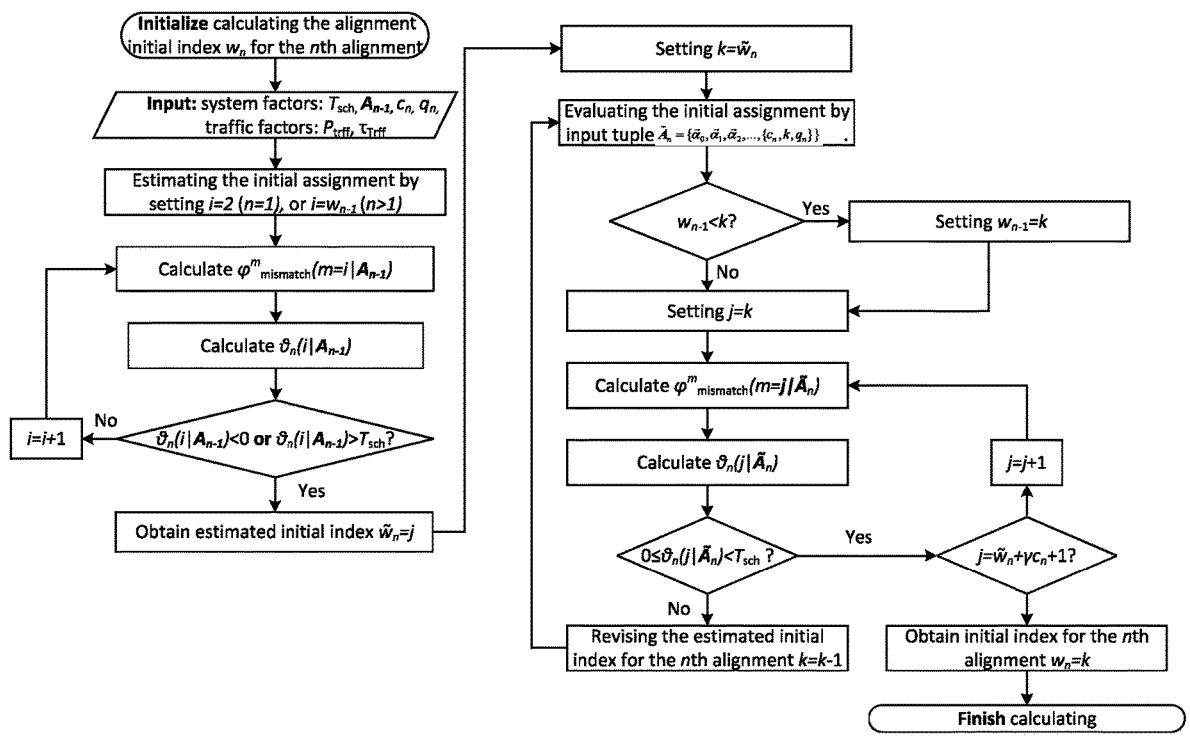
FIG. 13 is a flow diagram of a method of calculating an initial index in accordance with an embodiment.

The calculation procedure of the exact initial index $w_n$ in the nth alignment is given in FIG. 13. Accordingly, first an estimated initial index $\tilde{w}_n$ is calculated by using the known parameters in $A_{n-1}$. Then, a tuple $\tilde{A}_n$ is temporarily constructed, including the exact factors $\{\vec{\alpha}_0, \vec{\alpha}_1, \ldots, \vec{\alpha}_{n-1}\}$ and the vector $\vec{\alpha}_n=\{c_n, \tilde{w}_n, q_n\}$ including the estimated initial index $\tilde{w}_n$. Finally, a limited performance time is evaluated by setting $A_n=\tilde{A}_n$, and gradually correcting $\tilde{w}_n$ if the tuple $\tilde{A}_n$ is not the ideal solution.

To derive the exact initial index $w_n$ of the nth alignment, the scheduling slot of the ith assignment $\varphi_{mismatch}^m$ ($m=i|A_{n-1}$) is calculated by increasing the variable i along the order I, which is given by $$I = \begin{cases} [2, 3, \ldots, c_n+1], & n=1, \\ [w_{n-1}, w_{n-1}+1, \ldots, w_{n-1}+c_n+1], & n>1. \end{cases} \tag{17}$$

It is restated that $\varphi_{mismatch}^m(m=i|A_{n-1})$ can obtained via Equations (6) and (7) conditioning on the known factors $A_{n-1}$. After that, the gap $\theta_n(i|A_{n-1})$ between the time of $\varphi_{mismatch}^m(m=i|A_{n-1})$ and the time of the ith packet is calculated:

$$\theta_n(i|A_{n-1})=(\varphi_{mismatch}^m(m=i|A_{n-1})-1)T_{sch}-\tau_{trf}-(i-1)T_{trf} \tag{18}$$

Then, it is considered whether the obtained gap $\theta_n(i|A_{n-1})$ satisfies the condition of $(\theta_n(i|A_{n-1})<0$ or $\theta_n(i|A_{n-1}) \geq T_{sch})$. If true, the estimated initial index, $\tilde{w}_n=i$, is obtained. Otherwise, this evaluation process is repeated by setting $i:=i+1$ until a variable i is found such that its gap $\theta_n(i|A_{n-1})$ satisfies $(\theta_n(i|A_{n-1})<0$ or $\theta_n(i|A_{n-1}) \geq T_{sch})$. Accordingly, the estimated tuple $\tilde{A}_n=\{\vec{\alpha}_0, \vec{\alpha}_1, \vec{\alpha}_2, \ldots, \{c_n, \tilde{w}_n, q_n\}\}$ is obtained. Then, the scheduling slot of the jth assignment $\varphi_{mismatch}^m(m=j|\tilde{A}_n)$ is calculated, conditioning on the estimated tuple $\tilde{A}_n$ by increasing the variable j along the order J, which is given by:

$$J = \begin{cases} [\tilde{w}_n, \tilde{w}+1, \ldots, \tilde{w}_n+c_n+1], & n<N, \\ [\tilde{w}_n, \tilde{w}_n+1, \ldots, \tilde{w}_n+\gamma c_n+1], & n=N. \end{cases} \tag{19}$$

In equation (19), $\gamma$ is an integer constant that dominates the accuracy of the Nth alignment, which can be selected from the range $[2,3,\ldots,+\infty]$. According to the described example, selecting $\gamma=3$ generally guarantees the ideal solution in any situation.

Similar to equation (18), the gap $\theta_n(j|\tilde{A}_n)$ between the time of $\varphi_{mismatch}^m(m=j|\tilde{A}_n)$ and the time of the jth packet is calculated:

$$\theta_n(j|\tilde{A}_n)=(\varphi_{mismatch}^m(m=j|\tilde{A}_n)-1)T_{sch}-\tau_{trf}-(j-1)T_{trf} \tag{20}$$

Then, an evaluation is conducted as to whether the gap $\theta_n(j|\tilde{A}_n)$ satisfies the condition $0 \cdot \theta_n(j|\tilde{A}_n)<T_{sch}$ for any $j \in J$. if not, $\tilde{w}_n:=\tilde{w}_n-1$ is executed until an initial index $w_n=\tilde{w}_n$ is obtained that can satisfy that condition.

Once $\tilde{w}_n<w_{n-1}$, it is also necessary to revise $w_{n-1}$ by setting $w_{n-1}:=\tilde{w}_n$. Finally, this process is repeated to calculate the initial index $w_n$ for any nth alignment until n=N, and the exact scheduling factors $A_N=\{\vec{\alpha}_0, \vec{\alpha}_1, \ldots, \vec{\alpha}_N\}$ are obtained.

Time-Redundant TAPS Scheme

Figure 14:
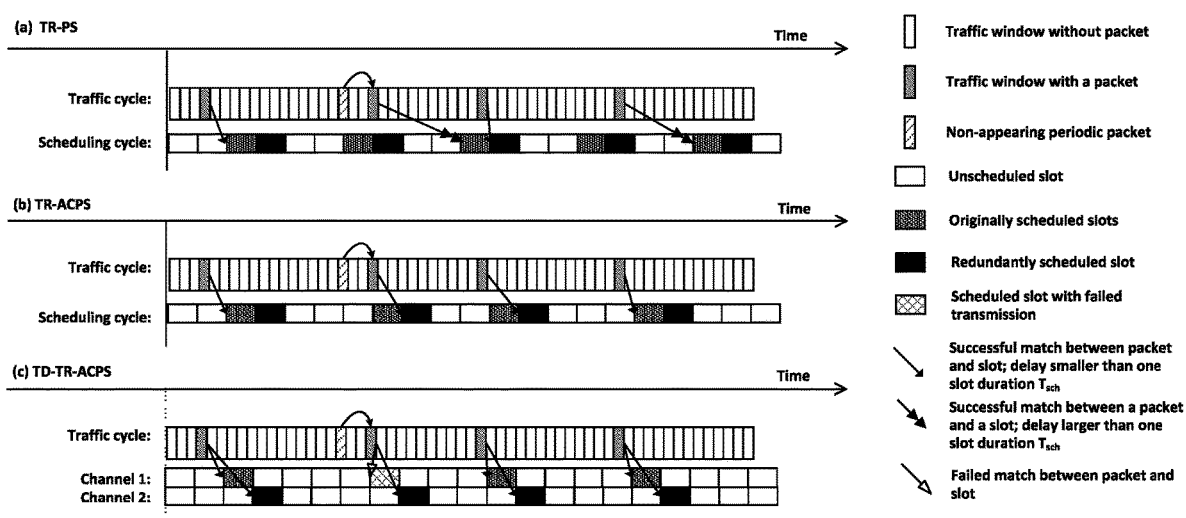
FIG. 14 is a timing diagram for scheduling and allocation in accordance with examples of the described embodiment.

The above-described TAPS scheme can completely eliminate the transmission delay produced by the mismatching between traffic period and scheduling period. However, in practice, a packet may suffer from a producing delay in the transmitter before it is ready to be transmitted. Once this occurs, this packet may miss the scheduled channel unit, which results in packet discard, or an occupation of the channel unit that should be scheduled to the packet after the delayed one. For the benefit of this disclosure, these cases are named as a producing delay disaster; they inevitably increase the overall transmission delay. With an intention to address this, the present disclosure provides a Time-Redundant TAPS (TR-TAPS) scheme. An example of use of this is shown in FIG. 14.

The BS 100 first determines the scheduling policy based on the original TAPS scheme, where its mth assignment is $\varphi_{ACPS}^m = \varphi_{mismatch}^m$ in the period-mismatching case and $\varphi_{ACPS}^m = \varphi_{match}^m$ in the period-matching case. Then, the BS 100 schedules the number L of successive channel units right after $\varphi_{ACPS}^m$ and before $\varphi_{ACPS}^{m+1}$. If the number of available slots between $\varphi_{ACPS}^m$ and $\varphi_{ACPS}^{m+1}$ was smaller than L (i.e., the channel units are insufficient to serve redundant scheduling), whole channel units would be scheduled. Without considering this insufficient case, the exact scheduled slot of the mth assignment with the TR-TAPS scheme is obtained by:

$$\varphi_{TR-ACPS}^m = \varphi_{ACPS}^{\lfloor \frac{m-1}{L} \rfloor + 1} + [m - 1 \bmod L] \quad (21)$$

Examples of executing the conventional TR-PS scheme and the TR-TAPS scheme are given in FIG. 14(a) and FIG. 14(b), respectively. As can be seen in FIG. 14(b), the 2nd packet cannot be allocated to the originally scheduled slot by the TAPS scheme, since it suffers from a producing delay. By using the TR-TAPS scheme, this packet captures the redundantly scheduled slot, rather than being discarded or occupying other's channel units, thus the producing delay disaster is avoided.

TAPS Scheme with Hybrid Automatic Repeat Request (HARQ)

In cellular networks, once data units are missed or are erroneously decoded, retransmissions can be primarily handled by a HARQ mechanism defined in the MAC layer, and be complemented by the retransmission functionality of the radio link control protocol. The HARQ can be executed in either asynchronous or synchronous manner: asynchronous HARQ involves retransmissions occurring at any time (based on dynamic scheduling), whereas synchronous HARQ involves retransmissions occurring at a fixed time after the previous transmission. When asynchronous HARQ is employed, the TAPS scheme can be directly employed to schedule the channel units for the primary transmissions. When synchronous HARQ is employed, the TAPS scheme can be employed to schedule the channel units for both primary transmissions and retransmissions. The exact scheduled slot of the mth assignment in the kth retransmission can be obtained by $$\varphi_{ACPS,k}^m = \varphi_{ACPS}^m + kT_{retran} \quad (22)$$

where $T_{retran}$ is the window length of each retransmission.

Transmission Duplicated TR-TAPS Scheme Transmission duplication is generally used to improve communication service reliability when transmission is not reliable enough with a single path link. This duplication adds link redundancy at the cost of increased channel resource usage. Previously, several different approaches have been proposed to enable redundant transmission paths.

These methods obtain transmission gain by providing transmission diversity from the domain of time, frequency, space, or a combination of them. Here, a duplication method is considered which relies on a strict principle of time hopping along with a flexible choice of channels in frequency domain.

An example therefore considers that there are J channels that can be used for transmission duplication with each being divided into channel units with the same size. The offset between the original subcarrier and the subcarrier carrying the duplicate data is calculated by the BS. The exact scheduled slot of the mth assignment in the jth channel is denoted by $\varphi_j^m$. The scheduling policy in the first channel is based on the disclosed TAPS scheme, where its mth assignment is $\Psi_{ACPS}^m = \varphi_{mismatch}^m$ in the period-mismatching case and $\varphi_{ACPS}^m = \varphi_{match}^m$ in the period-matching case. The exact scheduled slot of the mth assignment in the jth channel is obtained by $$\varphi_j^m = \varphi_{ACPS}^m + j - 1 \quad (23)$$

Examples of executing the TD-TR-TAPS scheme is given in FIG. 14(c). As can be seen in FIG. 14(c), the second packet misses the scheduled channel unit in channel 1, but captures the one in channel 2. By doing so, the transmission duplication not only improves the reliability of the communication service, but also solves the problem of the producing delay disaster.

Performance Evaluation

To evaluate performance of the disclosed approaches, a network is considered in which the channel is slotted to channel units with a fixed duration $T_{sch}=144$ μs. Three baseline schemes are considered, namely, PS-1, PS-2, and PS-3, which schedule channel units based on fixed scheduling cycles $$c_{fixed} = \left\lfloor \frac{P_{trff}}{T_{Sch}} \right\rfloor, \left\lfloor \frac{P_{trff}}{2T_{Sch}} \right\rfloor, \text{ and } \left\lfloor \frac{P_{trff}}{3T_{Sch}} \right\rfloor$$

that contribute to channel utilizations about 90%, 45%, and 30%, respectively.

Figure 15:
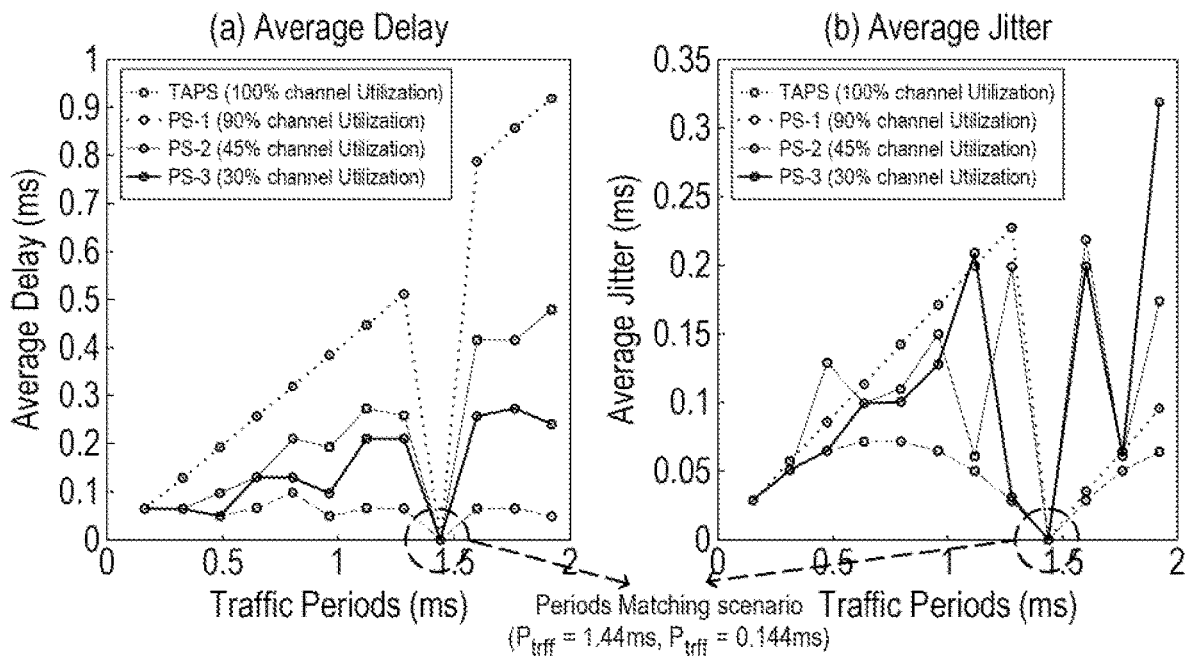
FIG. 15 is a graph plotting average delay and jitter for channel allocation in examples of the present disclosure.

FIG. 15 plots the average delay and jitter of TAPS scheme and conventional PS schemes versus traffic period, including several sampled values $P_{trff}=0.16*\{1, 2, 3, \ldots, 12\}$. As shown in FIG. 15, except for the period-matching event when $P_{trff}=1.44$ ms (i.e., scheduled with cycle $c_{fixed}=1.44/0.144=10$), the above described TAPS scheme considerably outperforms the conventional PS schemes in terms of both delay and jitter.

Figure 16:
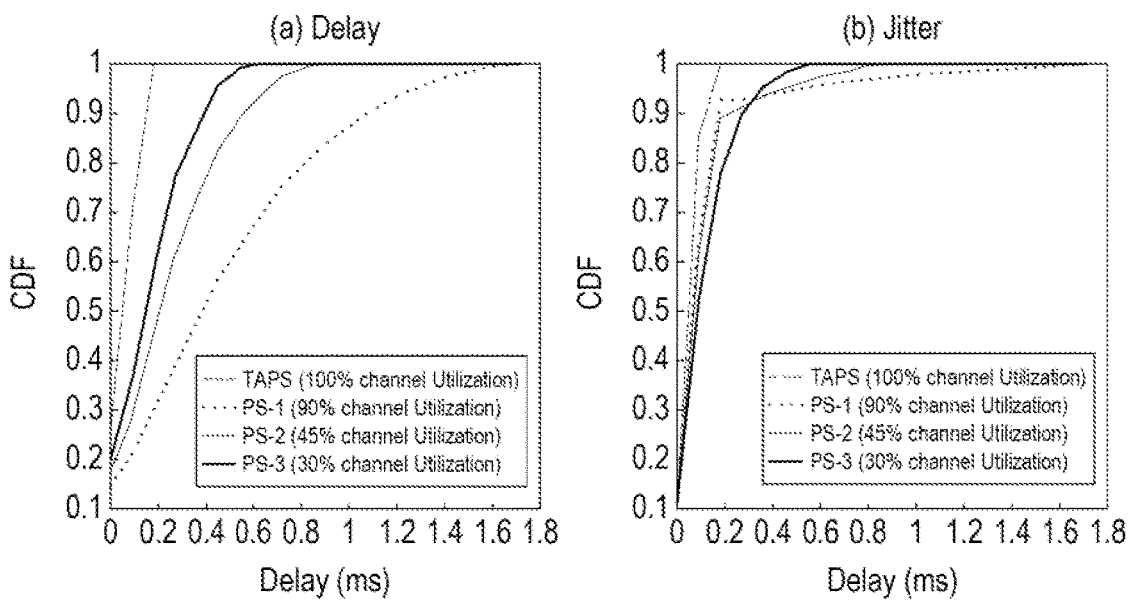
FIG. 16 is a graph plotting cumulative distribution function of delay and jitter between examples of the present disclosure.

FIG. 16 compares cumulative distribution function (CDF) of delay and jitter between the TAPS scheme disclosed herein and the conventional PS schemes. The simulation considers all values of the traffic period within the range $P_{trff} \in [0.144, 2]$ ms. As can be seen, embodiments of the TAPS scheme disclosed herein can considerably reduce the delay and jitter in many cases.

Figure 17:
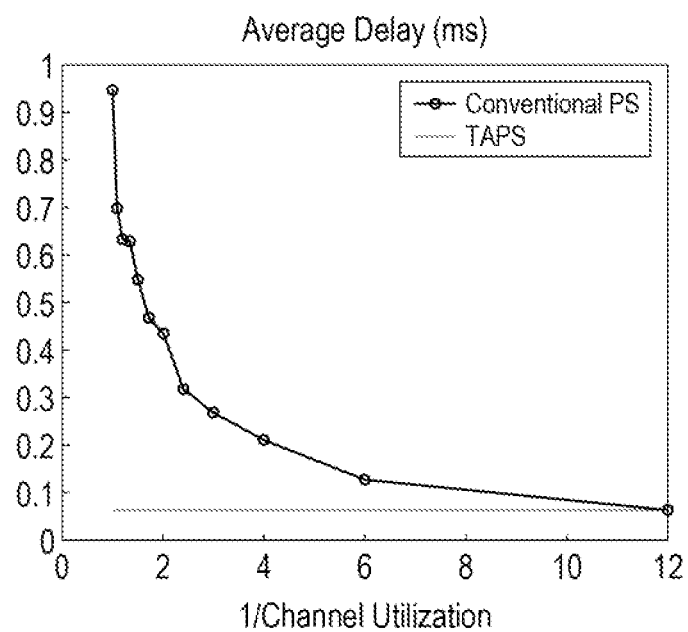
FIG. 17 is a graph plotting average delay between examples of the present disclosure.

Taking the specific traffic period $P_{trff}=1.6$ ms as an example, FIG. 16 plots the average delay of conventional PS schemes versus the reciprocal of channel utilization. Different reciprocal of channel utilization is obtained by setting different scheduling cycle $c_{fixed}$, where the smallest one is obtained by using the biggest cycle $c_{fixed}=11$, and the biggest one is obtained by using the smallest cycle $c_{fixed}=1$. As shown in FIG. 17, to obtain the same performance as the disclosed TAPS scheme, the conventional PS needs to consume 12 times more channel resources than the TAPS.

Figure 18:
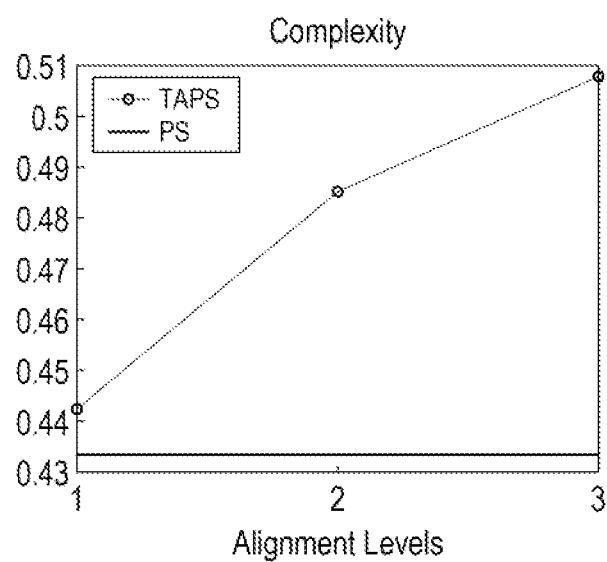
FIG. 18 is a graph plotting computational cost of examples of the present disclosure.

In FIG. 18, the above described TAPS method is implemented, as well as conventional PS. The computational cost of each is analyzed in terms of execution time. The illustrated examples are based on implementations performed in MATLAB. The execution time takes into account the time consumed during calculating the exact index of the assignment channel using equations (6) and (7) for each transmission. The reader will note that the execution time increases with the increase of the required number of alignments. Luckily, the TAPS scheme with only 3 alignments can guarantee the optimal scheduling for all scenarios in cellular networks. It is further observed that TAPS with 1, 2, and 3 alignments (0.442, 0.485, and 0.505 µs) respectively consume 2%, 12%, and, 17% execution times more than that of the conventional PS (0.433 µs).

Technical advantages of certain embodiments disclosed herein include the following.

Certain embodiments aim to minimize waiting delay and jitter conducted by mismatching persistent scheduling, and obtaining performance approaching the theoretically optimal.

Certain embodiments aim to maximize channel utilization, and obtaining performance approaching the theoretically optimal.

Certain embodiments aim to exploring transmission duplication with a view to reducing waiting delay and jitter conducted by persistent scheduling.

Certain embodiments offer reliability improvement as well as latency reduction for critical applications.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of scheduling traffic on a wireless communication channel, the method comprising:
   acquiring system factors and traffic factors of demanded traffic on the channel, the channel being defined in a communications medium for communication between devices;
   calculating, based on the system factors and the traffic factors of the demanded traffic, a root scheduling cycle for transmission on the channel and one or more alignment parameters defining a manner in which the demanded traffic is to be scheduled, the root scheduling cycle being varied based on the one or more alignment parameters; and
   outputting the root scheduling cycle and the one or more alignment parameters to enable scheduling of the demanded traffic on the channel.

2. The method in accordance with claim 1 performed at a first device, for communication with a second device, wherein the demanded traffic indicates traffic from the first device to the second device, and wherein the method further comprises transmitting the outputted root scheduling cycle and the one or more alignment parameters to the second device so that the second device can determine a schedule therefrom.

3. The method in accordance with claim 1 performed at a first device, for communication with a second device, wherein the demanded traffic indicates traffic from the second device to the first device, the acquiring comprising receiving at the first device a transmission request from the second device, and wherein the method further comprises sending a channel grant request to the second device from the first device, the channel grant request comprising the outputted root scheduling cycle and the one or more alignment parameters to the second device so that the second device can determine a schedule therefrom.

4. The method in accordance with claim 1, further comprising receiving a traffic scheduling request and setting a root scheduling cycle on the basis of a recursive process with respect to attributes of a received traffic scheduling request.

5. The method in accordance with claim 4, wherein the recursive process is finite.

6. The method in accordance with claim 5, further comprising ceasing the recursive process on meeting an optimality condition.

7. The method in accordance with claim 4, wherein the recursive process is executed until a condition is satisfied, the condition concerning the system factors and the traffic factors.

8. The method in accordance with claim 1, wherein the root scheduling cycle is revised by postponing or expediting scheduled channel units, the channel being divided into the channel units with lengths from a temporal domain.

9. A wireless communications device for establishing wireless communication with another device, the wireless communications device being configured to receive a root scheduling cycle and one or more alignment parameters generated by the method in accordance with claim 1, and a processor configured to generate a channel access schedule for the another device on the basis of the received root scheduling cycle and the one or more alignment parameters.

10. A wireless communications device comprising:
    a processor to schedule traffic on a wireless communication channel, the wireless communication channel being defined in a communications medium for communications between devices, the processor configured to:
    acquire system factors and traffic factors of the demanded traffic on the channel, the channel being defined in a communications medium for communications between devices:
    calculate, based on the system factors and the traffic factors of the demanded traffic, a root scheduling cycle for transmission on the channel and one or more alignment parameters defining a manner in which the demanded traffic is to be scheduled, the root scheduling cycle being varied based on the one or more alignment parameters; and
    output the root scheduling cycle and the one or more alignment parameters to enable scheduling of the demanded traffic on the channel.

11. The device in accordance with claim 10, further comprising a transmitter configured to transmit traffic to another device, wherein the device is configured to send outputted root scheduling cycle and the one or more alignment parameters to the another device so that the another device can determine a schedule therefrom.

12. The device in accordance with claim 10, further comprising:
    a receiver configured to receive a transmission request from another device, the processor being configured to process a received transmission request in order to derive the system factors and the traffic factors of the demanded traffic on the channel; and
    a transmitter configured to transmit traffic to another device, wherein the device is configured to send a channel grant request to the another device, the channel grant request comprising the outputted root scheduling cycle and the one or more alignment parameters so that the another device can determine a schedule therefrom.

13. The device in accordance with claim 10, wherein the processor is configured to set a root scheduling cycle on the basis of a recursive process with respect to attributes of a received traffic scheduling request.

14. The device in accordance with claim 13, wherein the recursive process is finite.

15. The device in accordance with claim 14, wherein the processor is configured to cease the recursive process on meeting an optimality condition.

16. The device in accordance with claim 13, wherein the recursive process is executed until a condition is satisfied, the condition concerning the system factors and the traffic factors.

17. The device in accordance with claim 10, wherein the root scheduling cycle is revised by postponing or expediting scheduled channel units, the channel being divided into the channel units with lengths from a temporal domain.

18. A non-transitory computer program product comprising computer executable instructions which, when executed on a computing device, cause the device to perform a method comprising:

acquiring system factors and traffic factors of demanded traffic on the channel, the channel being defined in a communications medium for communication between devices;

calculating, based on the system factors and the traffic factors of the demanded traffic, a root scheduling cycle for transmission on the channel and one or more alignment parameters defining a manner in which the demanded traffic is to be scheduled, the root scheduling cycle being varied based on the one or more alignment parameters; and outputting the root scheduling cycle and the one or more alignment parameters to enable scheduling of the demanded traffic on the channel.

19. The non-transitory computer program product in accordance with claim 18, wherein the root scheduling cycle is revised by postponing or expediting scheduled channel units, the channel being divided into the channel units with lengths from a temporal domain.

* * * * *